No. 677,643. Patented July 2, 1901.
F. G. DIETERICH.
FORMALDEHYDE GENERATOR.
(Application filed Mar. 6, 1901.)
(No Model.) 3 Sheets—Sheet 2.
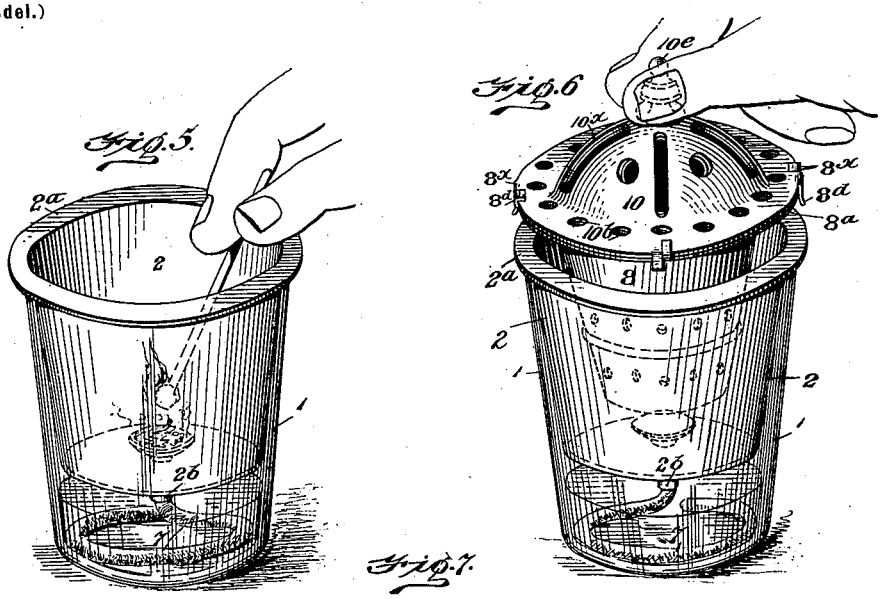
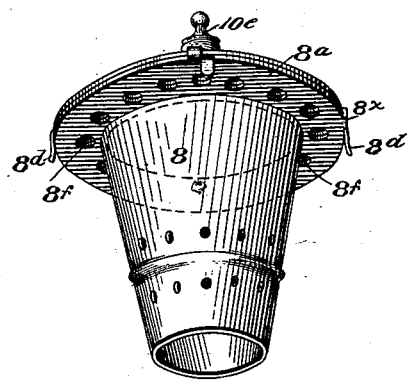
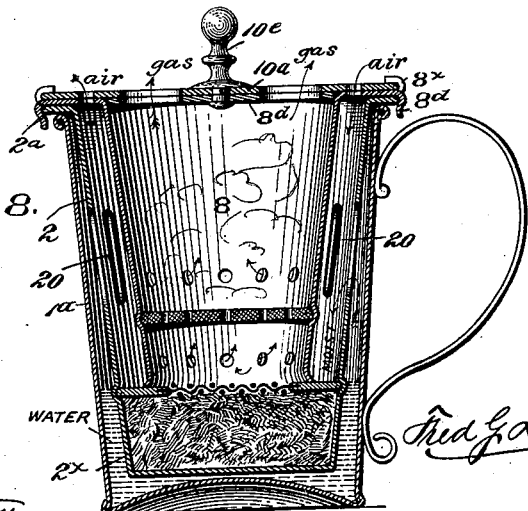
WITNESSES:
INVENTOR
Fred G. Dieterich No. 677,643. Patented July 2, 1901.
F. G. DIETERICH.
FORMALDEHYDE GENERATOR.
(Application filed Mar. 6, 1901.)
(No Model.) 3 Sheets—Sheet 3.
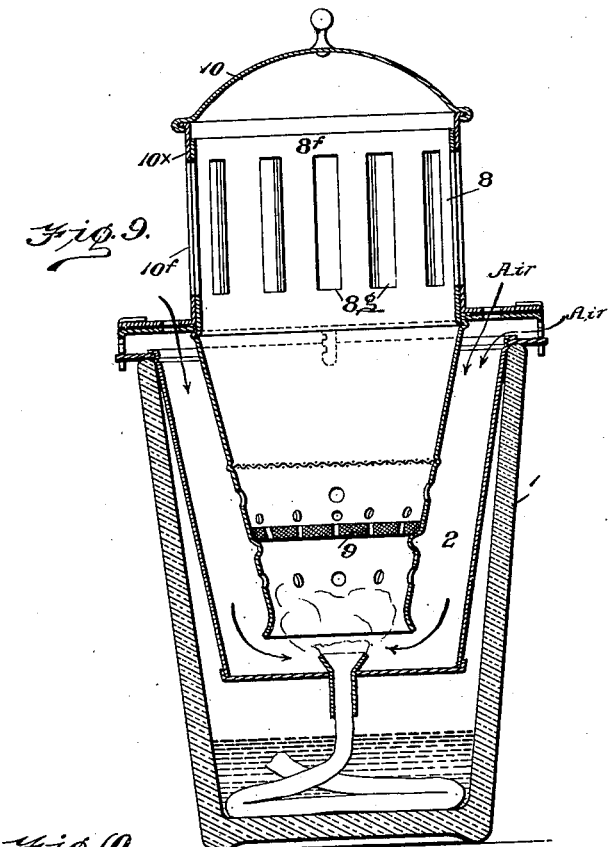
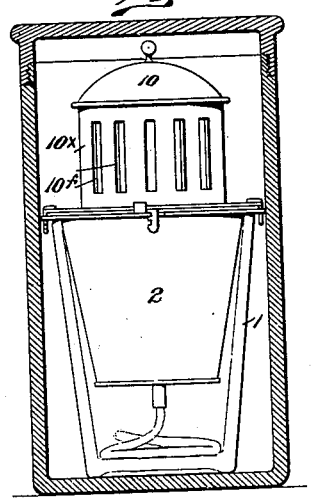
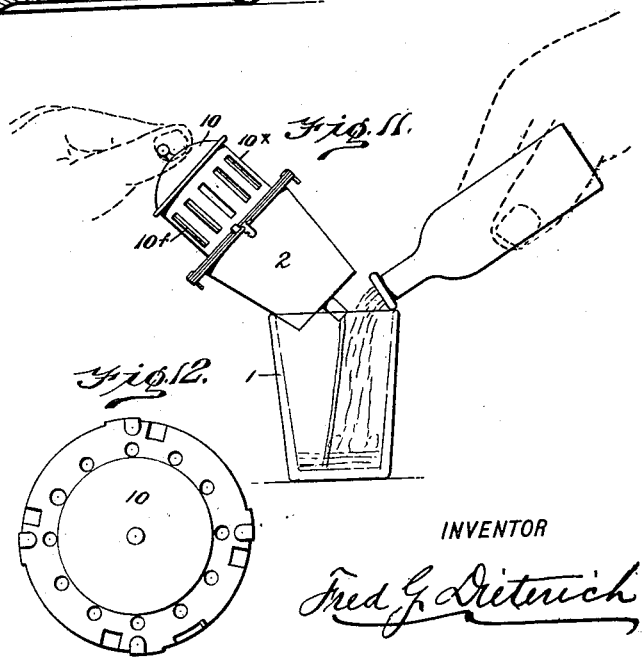
WITNESSES: H. G. Dieterich, Guy Worthington
INVENTOR Fred G. Dieterich

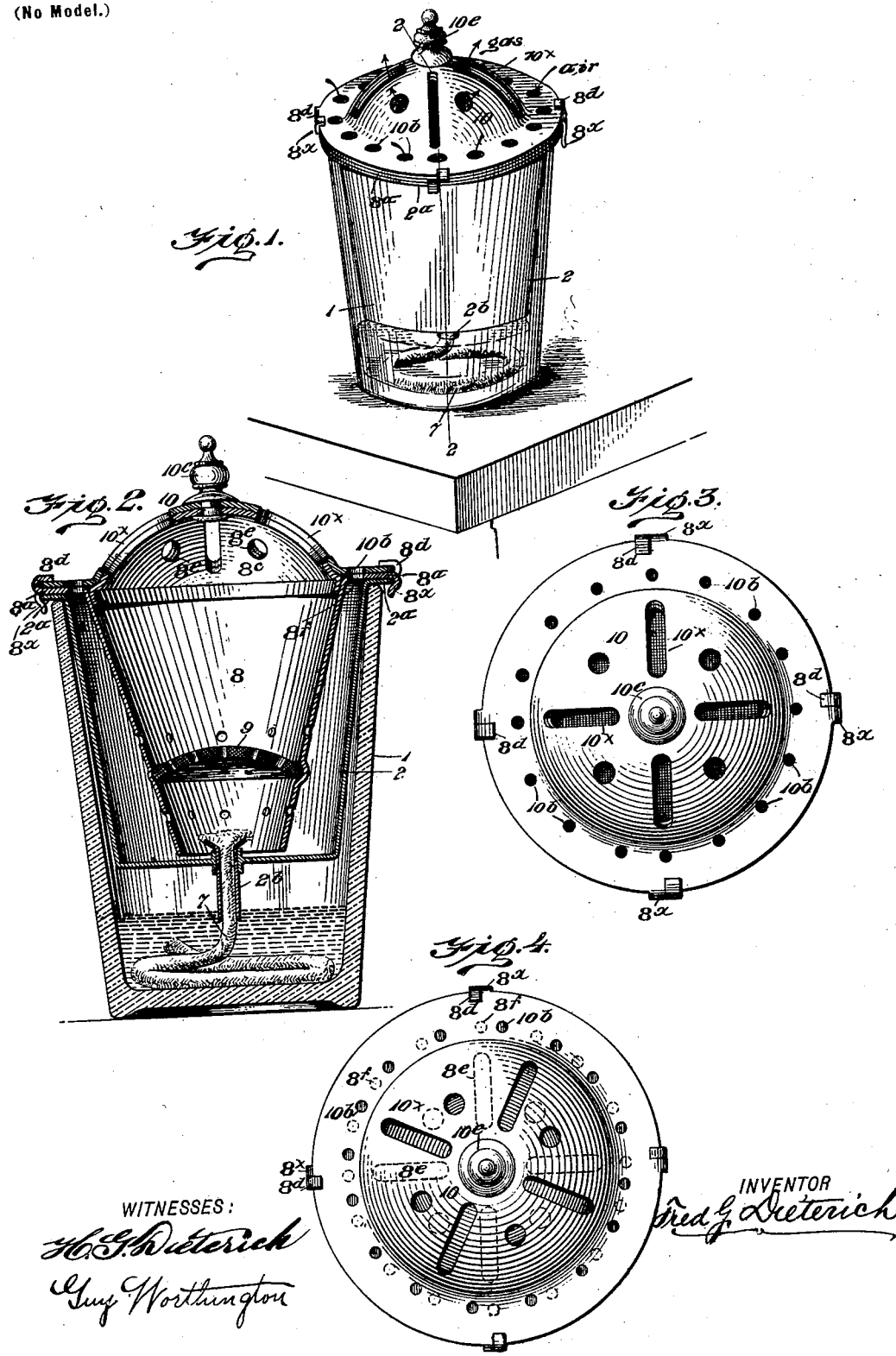

UNITED STATES PATENT OFFICE.

FRED G. DIETERICH, OF WASHINGTON, DISTRICT OF COLUMBIA.

FORMALDEHYDE-GENERATOR.

SPECIFICATION forming part of Letters Patent No. 677,643, dated July 2, 1901.

Application filed March 6, 1901. Serial No. 50,104. (No model.)

*To all whom it may concern:*

Be it known that I, FRED G. DIETERICH, residing at Washington city, in the District of Columbia, have invented a new and Improved Formaldehyde-Generator, of which the following is a specification.

My invention relates to that type of generating appliances for producing formaldehyde for disinfecting purposes especially arranged to generate the formaldehyde and disseminate it in a room or other places, as it is produced.

Heretofore various forms of formaldehyde-generating lamps of the character stated have been provided, which have operated with more or less success, but have failed to produce all of the results desired, as the expense thereof has generally been such as to render their use among the poorer classes almost an impossibility, and by reason in many cases of their complex nature and a special arrangement required thereof it has been inexpedient to place them in the hands of inexperienced or other persons not versed in the art of formaldehyde generation or its application, as it has been usually required that the adjusting and manipulation of the said lamps be done by physicians or others experienced in the handling of disinfectants.

The main object of my invention is to provide a formaldehyde-generator of a very simple and economical nature which can be manufactured at a cost that will make its general use possible and in which the several parts are so arranged and coöperatively combined that they may be used by any one of ordinary intelligence without the least danger.

My invention also comprehends a generator of the kind stated of a very compact form and in its simplest construction no larger than the ordinary drinking-tumbler, and in which the body is so arranged as to remain cool during use, whereby to permit the appliance being grasped and moved about from place to place without danger of burning the hands.

Again, my invention seeks to provide a formaldehyde-generating means made of metal, and capable of being used in connection with any ordinary type of drinking-tumbler, it providing, as it were, a new article of manufacture, a gas-generating means, adapted to be detachably held upon the glass tumbler.

Another and very essential object of my invention is to provide a simple form of gas-generating means of the character stated which includes an air-controlling device fixedly connected with the generating vessel and capable of being instantly adjusted for cutting off or opening up the air to the interior parts thereof.

A still further object of my invention is to provide a holding vessel and a generating means and adapted to be detachably supported upon the vessel and including a burner-pan held pendent within the vessel in such manner whereby the said pan can be readily immersed in water held in the bottom of the said vessel, a generating-chamber, and means for providing for a free circulation and an intermixing of the vapors or moist atmosphere from the holding vessel with the generated fumes, whereby to produce a moist formaldehyde gaseous production, such as is usually found of great efficiency for penetrating fabrics, furniture, &c., to render innocuous infected materials.

With the aforesaid objects in view and others that will hereinafter appear my invention consists generally in a holder, a burner detachably held therein, and a generating-chamber, including a platinized disk or mantle, all being coöperatively supported within the holder detachably therefrom and from each other.

The invention in its more complete form embodies the ordinary glass tumbler, adapted to hold the wood-spirit in the bottom thereof, and an inverted-cup-shaped vessel adapted to fit in the tumbler and close off the spirit-holding part thereof from atmosphere and having a burner-wick whose head portion extends up into the cup and whose body portion is suspended therefrom to fill into the bottom of the tumbler when the parts are placed in an operative position and a generating-chamber detachably supported within the cup-shaped vessel, a platinized disk held in the said generating-chamber, and muffling means attached to the said generating-chamber for regulating the air-supply.

In its subordinate features my invention consists in certain details of construction and peculiar combination of parts, all of which will hereinafter be fully explained, and particularly pointed out in the appended claims, reference being had to the accompanying drawings, in which—

Figure 1 is a perspective view of the preferred form of my invention, the parts being in position to generate formaldehyde. Fig. 2 is a vertical section of the same, taken practically on the line 2 2 of Fig. 1. Fig. 3 is a plan view of the same, the parts being adjusted as in Figs. 1 and 2. Fig. 4 is a similar view the cap or muffle plate being shown in the position to shut off the air from the burner. Figs. 5 and 6 illustrate the manner in which the lamp is set up for use, Fig. 5 showing the burner seated in place and the manner in which the same is ignited, and Fig. 6 showing the way the generating-chamber is fitted in position over the burner. Fig. 7 is an inverted perspective view of the generating-chamber. Fig. 8 is a vertical section of a modified form of my invention, hereinafter specifically referred to. Fig. 9 is a vertical section of another modification of my invention, the generator being at the elevated position to which it is adjusted during the operation of heating the diaphragm. Fig. 10 is a side elevation of the same held within a suitable casing to serve as a pocket-generator, and Fig. 11 illustrates the manner in which the apparatus can be recharged without stopping the generation of formaldehyde. Fig. 12 is a top plan view of the form of my invention shown in Figs. 10 and 11.

Referring now particularly to Figs. 1 to 4, inclusive, 1 designates the holder, which may be the ordinary glass tumbler, as shown in Figs. 1, 2, 5, and 6, or it may be of metal, as shown at $1^a$ in Fig. 8, and provided with a suitable handle $1^b$.

2 denotes an inverted-cup-shaped vessel or casing, which may fit close up to the side of the holder 1, and to adapt it for use with different sizes of tumblers the same is made slightly cone-shaped. This latter form provides for an air-space between the walls of the casing 2 and the tumbler 1, which serves to hold the heat radiating from the casing 2 and keep the glass body cool.

The upper end of the casing 2 has an annular flange $2^a$, which fits over the upper rim of the holder 1 and supports the casing. The said casing 2 is of a length to extend (in the form shown in Figs. 1 and 2) approximately two-thirds the distance down into the tumbler 1, and at its bottom it has a pendent wick-tube $2^b$, which tube also extends up into the casing, and the upper end terminates in an enlarged or flaring seat to permit spreading the wick or other spirit-absorbent material 7, whereby to produce a spirit-holding surface of an increased diameter over that of the wick-tube proper.

The generating-chamber comprises a body portion 8, having an inverted cone shape, its base or largest portion being, however, of a less diameter than that of the casing 2, whereby an air-space is produced between the body 8 and the casing 2, which space, by reason of the conical shape of the body 8, has its largest diameter or area at the burner portion of the casing. This relative arrangement of the body 8, the casing 2, and the burner provides, first, for concentrating the burner-flame and the vaporous discharges therefrom in a compact volume into the contracted end of the body 8 and against the catalytic or platenized diaphragm 9, and, secondly, it effectively prevents the casing 2 from getting hot, and thereby makes it possible to grasp the tumbler-body during the process of generating (at which time the disk 9 and its surrounding parts are under an intense heat) to move the lamp from place to place without danger of burning the hands, this latter advantage being a great desideratum in a sick-room, where the condition of the patient often makes the shifting about of the lamp both desirable and necessary. The body 8 is also provided with an annular rim $8^a$ of a width sufficient to project over and to rest upon the rim $2^a$ of the casing 2, and from the rim $8^a$ the said body 8 extends up either in a dome-like member $8^c$, as shown in Figs. 1 and 2, or in a flat crown-surface, as indicated at $8^d$ in Fig. 8. The outer edge of the rim $8^a$ has a series of downturned spring-fingers $8^d$ to engage with and spring over the outer edge of the rim $2^a$, whereby to lock the member 8 from accidental displacement during the ordinary handling of the lamp. Said rim $8^a$ also has upturned guide-fingers $8^d$, that project over the outer face of the rim, the reason for which will presently appear.

The fingers $8^d$ in the construction shown in Fig 9 have an edge notch $8^x$ to engage with the notched edges $2^x$ of the annular rim of the vessel 2 when the generator-body 8 is elevated to allow for a proper supply of air to feed the burner when same is lighted to heat the diaphragm 9.

The dome-like member $8^c$ has a series of openings $8^e$, that communicate with the generating-chamber, and the rim $8^a$ has an air-inlet $8^f$, through which the air passes to feed the burner to create proper combustion and generating results.

So far as described it will be seen the several parts are so coöperatively arranged as to provide proper space for the circulation of air around the burner and in sufficient volume to keep the body 1 cool enough to be handled without danger.

Now comes an essential and advantageous feature of my invention, the construction and the mode of operation of which will be best understood by reference to Figs. 1 and 4, from which it will be seen that upon the crown or top part of the body 8 is rotatably mounted a muffle-plate or air-controlling member 10, which has the contour of the crown or dome member $8^c$ when such form of top is used, or it is in the nature of a flat disk $10^a$ when used in the modified form of my invention as disclosed by Fig. 8. The rotatable member 10 has an annular rim $10^a$, provided with a series of air-inlets $10^b$, adapted to be brought into position and register with the air-inlets in the rim $8^a$, it also having suitable openings $10^c$, adapted to register with the opening $8^e$, which communicates with the generating-chamber, and the said member 10 has a turning knob or handle $10^e$, as shown. The member 10 is held in position upon the top of the generating-chamber by the guide-fingers $8^e$. (See Figs. 1 and 2.)

The manner in which my formaldehyde-generator is used is simple and best explained as follows: Wood-spirit is poured into the tumbler or holder 1. The casing 2, with the wick, is then fitted into the holder, after which the user ignites the wick in the manner shown in Fig. 5. The generator-body 8, together with the muffler or air-controlling device, (the two parts being held together,) is then inserted in the manner shown in Fig. 6 and seated in place, it being understood that the muffler at this time is adjusted to have the several air-inlets open, as shown, and when thus fitted the several parts remain, as best shown in Fig. 2, until the diaphragm is heated to a glow or incandescence, which condition may be readily noticed through the openings in the top. As soon as the diaphragm is at a glow further combustion is arrested by simply turning the member 10 and bringing the several air-inlets out of register, as shown in Fig. 4, to cut off all air to the interior of the generator. This at once extinguishes the wick-flame. After this is done by turning the member 10 back again to the position shown in Fig. 3, to allow air to enter through the rim-inlets and the air-inlets $8^g$ in the body 8 above and below the body 9, the lamp will then generate formaldehyde in its natural and gaseous state until all of the alcohol in the bottom of the holder becomes exhausted or until the member 10 is again adjusted to cut off the air.

It will be observed that my construction of lamp permits of a quick, effective, and simple regulation of the air to the generating-chamber and burner, it being understood that should at any time it be desirable to cut off the gas from the lamp it is only necessary to turn member 10, when the odor from the lamp will cease, its removal from the room, as is ordinarily required in other forms of lamps, being therefore not required.

Among other advantages my form of lamp can be conveniently handled and used for ordinary nasal or bronchial purposes, as it is susceptible of being manipulated and placed to suit the condition of the patient, and the quantities of wood-spirit may be easily poured into the holder to prepare for a short or long generative operation. Its compactness permits of its being easily carried in an ordinary traveling-case.

Another advantage of my invention lies in the detachability of the metal portions of the generator when arranged as in Fig. 1 and in which the ordinary drinking-tumbler is utilized as the holder, in that should the user drop the lamp and break the holder the metal parts thereof will remain in condition to be fitted into another ordinary tumbler.

A still further and very advantageous result is that the atmospheric air is thoroughly heated as it passes down into the shell or casing 2 before it intermixes with the alcohol-fumes and engages the diaphragm. This method of feeding the air I have found to produce more formaldehyde from a given quantity of gaseous fluid than is possible where the air mixes with the vapors in its cold or natural temperature. Again, by feeding the air to the diaphragm in the manner best shown by arrows in Fig. 2 danger of blowing out the fumes by back drafts before they engage the diaphragm is entirely overcome, and in consequence a more uniform and effective flow of formaldehyde is obtained.

For hospital uses or for contagious diseases—such as small-pox, diphtheria, or scarlet fever—where a powerful germicide is required to penetrate fabrics, crevices, &c., moist formaldehyde has been found a very effective disinfectant. For producing the moist formaldehyde I arrange my invention in the manner shown in Fig. 6. In this form the same generic relation of the several parts as in Figs. 1 to 4 is maintained. In this form, however, the holder is preferably of metal and equipped with a handle, as this type of lamp in practice is larger than the form shown in Fig. 1, and the casing 2 in this latter form has a burner-pan $2^x$ to hold mineral wool or other absorbent. The body 1 in this form is intended to hold a filling of water in which the burner-pan $2^x$ is immersed when the parts are fitted together for use, and the casing 2 has a number of apertures 20, which open up communication between the holder 1 and the interior of the casing 2, and through the said openings the moist vapors from the holder 1 pass into the casing 2 and commingle with the air drawn in through the inlets in the rim 8 at the top. The remaining parts of the construction (shown in Fig. 8) are substantially the same as the similar ones in Figs. 1 and 2. The operation of this modified form of my lamp is the same. The results are also the same, with the exception that in addition the gases created thereby are of a moist character instead of dry, as is the resultant of the lamp shown in Figs 1 and 2.

Changes in the details of further modifications of my invention over what is shown and has been described may readily be made without departing from the scope of the appended claims.

In Fig. 9 is illustrated a slightly-modified form of generator-body. In this case the top of the body 8 terminates in a cylindrical flue 8^f, open at the top and having a series of side slots 8^g, and the muffle or air-controlling device is also made with a tubular body 10^x, having a dome or crown portion and slots 10^f in its sides, adapted to be moved into or out of register with the slots 8^g. This latter form I prefer for small or pocket-size generators, (see Fig. 11,) as the top 10 can be readily lifted off and free access had to the interior of body 8 to replace a worn-out diaphragm 9 when necessary.

I prefer to use a glass vessel, as the amount of the alcohol contained therein can be quickly ascertained, and in case it is desired to continue to use the generator after the first supply of alcohol has been used additional alcohol can be poured in by simply lifting up the entire metal or generator parts. This operation does not in the least interfere with the operation of the appliance, as generation continues so long as the wick remains moist with alcohol.

For passenger-cars, lavatories, or other places where a continual generation of disinfectant is required the body 1 may be made of sufficient size to hold a large quantity of alcohol—say enough to last for twenty-four to forty-eight hours—and when thus arranged the vessel is preferably of metal and provided with a gage or sight-opening to designate the height of fluid therein.

Having thus described my invention, what I claim, and desire to secure by Letters Patent, is—

1. A formaldehyde-generator, comprising in combination, the holder 1, the casing 2, detachably supported upon the rim of the holder 1, and having a burner in its bottom, and a gas-generating means, comprising a hollow body 8, having a member 8^a, adapted to detachably rest upon the rim of the holder 1, and a catalytic disk, held within the body 8, for coöperating with the burner, said body 8 being of less diameter than the casing 1, whereby an air-space is produced between the casing 2, and said body 8, the aforesaid member 8^a, having air-inlets opening into the said air-space, for the purposes specified.

2. A formaldehyde-generator, comprising in combination, a holder, a casing carrying a burner, detachably mounted in the said holder, and adapted to separate the holder into an upper and a lower compartment, the lower one of which is for holding wood-spirit; an oxidizing-chamber having a catalytic member for coöperating with the burner, detachably supported in the upper compartment, substantially as shown and described.

3. In a formaldehyde-generator, the combination with the holder 1, the casing 2, having a diameter and a depth less than that of the holder, and provided with an annular rim of greater diameter than that of the holder, an oxidizing-chamber consisting of the hollow body 8, of less diameter and depth than casing 2, and having an annular rim 8^a, adapted to rest on the rim of the said casing 2, said rim 8^a, having air-inlets; and the platinized disk 9, in the member 8, all being arranged substantially as shown and for the purposes described.

4. In a formaldehyde-generator, the combination with a holder, a casing supported thereon, separating the holder into an upper and a lower compartment, and a burner supported on the bottom of the casing; of a gas-generating means detachably suspended within the casing, said means including a catalytic medium for coöperating with the burner, and devices for controlling the inflow of air to the gas-generating means.

5. In a formaldehyde-generator, the combination with the holder, a casing supported therein, separating said holder into an upper and a lower compartment and adapted to close off air to the lower compartment; of the member 8, detachably supported in the aforesaid upper compartment, a platinized diaphragm held in the member 8, and means for controlling the inflow of air to said member 8, forming an attached part of said member 8, as specified.

6. A formaldehyde-generator, comprising a holder, a casing supported therein, and adapted to divide said holder into separate upper and lower compartments, and a gas-generating means suspended within the upper-casing compartment, detachably connected with such casing and removable therewith from the holder as a unitary structure, as specified.

7. In a formaldehyde-generator, of the character described, a holder having a plurality of compartments, a member having an oxidizing-chamber in one of said compartments, having gas-escape openings and air-inlets, and means mounted upon the oxidizing-chamber for simultaneously controlling the admission of air to the oxidizing-chamber, and the escape of gas therefrom substantially as described.

8. A formaldehyde-generator, comprising in combination, a holder, a tapering casing having a rim for resting upon the upper edge of the holder, and a wick-tube in its bottom, a hollow member suspended within the casing, and of a less height than that of the casing, said hollow member having a rim, adapted to project over the casing-rim, having air-inlets, said hollow member having gas-escape openings in its top, a turn-plate on the said top for controlling the air-inlets, and the gas-outlets aforesaid, and a platinized disk held in the hollow member to coöperate with the burner, for the purposes specified.

9. A formaldehyde-generator, comprising the following elements in combination; an open-top holder, a cup-shaped casing pendently and detachably supported within the holder, and adapted to separate the same into an upper and a lower compartment, the lower being adapted to receive the wood-spirit, said casing having a burner in its base, a hollow member adapted to be detachably suspended upon the upper end of the cup-shaped casing, a platinized disk held within the hollow member to coöperate with the burner, said hollow member having a top portion provided with openings for the ingress of air to and the egress of vapor from said hollow member, as set forth.

10. In a formaldehyde-generator, a holder, a tapered casing, having openings in the top and detachably supported on and projected down into the holder, a burner on the bottom of the casing, and a member supported within the casing, having an oxidizing-chamber for coöperating with the burner, for the purposes specified.

11. In a formaldehyde-generator, a holder, and a casing pendently supported on the holder, said casing having an annular flange at its upper end to engage the upper edge of the holder, and a burner at the bottom, and a member having an oxidizing-chamber and formed with an annular flange, whereby to pendently support it on the casing-flange.

12. In a formaldehyde-generator, a casing having an annular flange, and a burner; a member having an oxidizing-chamber pendently supported in the casing, and having an annular flange to rest on the other flange.

13. In a formaldehyde-generator, a casing having an annular flange, a member having an oxidizing-chamber extending down into the casing, said member having an annular flange to rest upon the other flange, and having an opening, the oxidizing-chamber having gas-discharges, and a cut-off supported and adapted to turn on the annular flange having the air-openings, said cut-off having two sets of openings to coöperate with the gas-discharges from the oxidizing-chamber, and the air-inlets, for the purposes described.

14. In a formaldehyde-generator of the character described, the combination with the holder 1, the tapering casing 2, said casing having means for supporting it within the holder, and a burner on the bottom of said casing; of the tapering member 8, having an apertured annular flange $8^a$, adapted to rest upon the upper edge of the casing 2, and a slotted top $8^c$, and the oxidizing-diaphragm 9, held within the member 8, all being arranged substantially as shown and for the purposes described.

15. A formaldehyde-generator, comprising an ordinary tumbler, and a gas-generating means, removably supported within the tumbler, said means consisting of the casing 1, having a flange to engage the tumbler edge, a wick in its bottom adapted to dip into the bottom of the tumbler, and a hollow member having discharge-openings at the top, an annular flange to rest on the casing-flange, having air-inlets opening between the walls of the hollow member and the casing-wall, said hollow member being of a depth less than that of the casing, and a platinized diaphragm held within the said hollow member to oppose the burner end of the wick in the bottom of the casing.

16. A means for generating formaldehyde gas, comprising a burner, a member having an oxidizing-chamber, provided with air-inlets and gas-outlets, a catalytic medium in said chamber for coöperating with the burner, and devices whereby to detachably support the said generating means upon and within an ordinary tumbler or cup-shaped holder.

17. A means for generating formaldehyde, comprising a casing, supportable upon and within an ordinary drinking-tumbler, and having a wick-holding tube in its bottom, an oxidizing-chamber within the casing, and a platinized diaphragm therein held over the wick-tube, said chamber having air-inlets and gas-outlets, substantially as shown and described.

18. As a new article for the purposes specified, a cup-shaped casing having a laterally-projecting portion, whereby it is adapted to be detachably supported within an ordinary drinking-tumbler, said casing having a wick-receiving tube, extended through its bottom, a hollow body open at the top and bottom of less diameter than the casing, and having means for detachably supporting it upon and within the casing, a platinized diaphragm held within the hollow body, and over the wick-holding tube, air-inlets to the lower end of the hollow body, and a top member having a handle, gas-escape openings, and means for detachably connecting it with the top of the hollow body having the platinized diaphragm, all being arranged substantially as shown and described.

FRED G. DIETERICH.

Witnesses:
 JESSE MIDDLETON,
 SOLON C. KEMON.